US008689737B2

(12) United States Patent
Gates (10) Patent No.: US 8,689,737 B2
(45) Date of Patent: Apr. 8, 2014

(54) WILDLIFE FEEDER

(75) Inventor: Burnell Gates, San Antonio, TX (US)

(73) Assignee: All Seasons Feeders, Inc., San Antonio, TX (US)

( * ) Notice: Subject to any disclaimer, the term of this patent is extended or adjusted under 35 U.S.C. 154(b) by 1009 days.

(21) Appl. No.: 12/290,387

(22) Filed: Oct. 30, 2008

(65) Prior Publication Data

US 2010/0107983 A1 May 6, 2010

(51) Int. Cl.
*A01K 5/00* (2006.01)
*A01K 5/02* (2006.01)

(52) U.S. Cl.
USPC .......................................... 119/53; 119/56.1

(58) Field of Classification Search
USPC ............... 119/51.01, 52.1, 52.4, 53, 53.5, 54, 119/56.1, 57, 57.91
See application file for complete search history.

(56) References Cited

U.S. PATENT DOCUMENTS

| 3,034,480 A * | 5/1962 | French ........................ 119/57.91 |
| 3,962,997 A | 6/1976 | Ruth |
| 4,582,023 A | 4/1986 | Zumbahlen et al. |
| 4,892,060 A * | 1/1990 | Lundquist ..................... 119/52.2 |
| 4,986,220 A | 1/1991 | Reneau et al. |
| 5,066,388 A | 11/1991 | Ross |
| 5,069,164 A | 12/1991 | Wiwi |
| 5,143,289 A | 9/1992 | Gresham et al. |
| 5,259,337 A * | 11/1993 | Rasmussen ................... 119/57.1 |
| 5,333,572 A | 8/1994 | Nutt |
| 5,503,090 A | 4/1996 | Guzan |
| 5,855,943 A | 1/1999 | Lush et al. |
| 5,862,777 A * | 1/1999 | Sweeney ..................... 119/57.91 |
| 5,967,083 A * | 10/1999 | Kleinsasser ..................... 119/53 |
| 6,199,509 B1 | 3/2001 | Mostyn et al. |
| 6,510,813 B1 | 1/2003 | Boone, Jr. |
| 6,722,311 B1 | 4/2004 | Sides et al. |
| 6,763,781 B1 * | 7/2004 | Norrell ....................... 119/57.91 |
| 6,899,056 B1 | 5/2005 | Kelly |
| 6,920,841 B2 | 7/2005 | Meritt |
| 6,920,842 B1 * | 7/2005 | Davis ............................... 119/53 |
| 7,175,103 B1 * | 2/2007 | Barley ............................... 239/1 |
| 7,222,583 B2 | 5/2007 | Foster et al. |
| 7,302,912 B2 * | 12/2007 | Boyer ........................ 119/57.91 |
| 7,370,605 B2 | 5/2008 | Meritt |
| 7,404,376 B2 * | 7/2008 | Hernandez ................. 119/57.91 |
| 2006/0048712 A1 | 3/2006 | Boyer |
| 2006/0283396 A1 | 12/2006 | Hernandez |
| 2008/0257270 A1 | 10/2008 | Slankard et al. |
| 2009/0120369 A1 | 5/2009 | Lewis |

* cited by examiner

*Primary Examiner* — David Parsley
(74) *Attorney, Agent, or Firm* — Jackson Walker, LLP (57) ABSTRACT

A wildlife feeder having a hopper, a manifold, and a removed head at a removed end of the manifold. The hopper is designed to enclose particulate feed, such as corn, for dispensing through the manifold and head to wildlife. The head has a multiplicity of feed troughs and each feed trough has an angled top wall and an angled bottom wall, angled with respect to a longitudinal axis of the manifold and a plane of a tabular floor of the head.

20 Claims, 9 Drawing Sheets

WILDLIFE FEEDER

FIELD OF THE INVENTION

Wildlife feeders, namely, wildlife feeders including a hopper, a cleanout manifold, and a dispensing head.

BACKGROUND

Wildlife feeders dispense feed, typically pelletized, granular, and particulate feed, such as corn, soybeans, and nutritional supplements.

Wildlife feeders may be passive, wherein a hopper delivers particulate feed to animals through a multiplicity of tubes or passages under the impetus of gravity. Some of the tubes are designed for access by the muzzle of a deer, elk or the like.

Other wildlife feeders are active, having electrical motors operated on timers, which periodically cast feed. With most casting type feeders, the animals simply eat the food from the ground.

There has been a need for a passive wildlife feeder which allows access to the feed in a head spaced below a hopper, while at the same time protecting exposure to harsh atmospheric forces (wind, rain, sleet, snow, direct sunlight, etc.) and the feed from "unwanted" critters (raccoons, squirrels, rodents, etc.), for which the feed is not intended. The outdoor environment in which wildlife feeders are placed includes exposure to elements which may deteriorate feed, and exposure to clever animals, which may deplete the feed intended for deer or the like.

While most prior art wildlife feeders have hoppers and feed troughs which keep the available feed well above the ground, critters and weather create problems, including wet feed and deletion of feed stores.

OBJECTS OF THE INVENTION

It is an object of this invention to provide a novel wildlife feeder which helps overcome some of the shortcomings of the prior art passive feeders, including components which cooperate to protect the feed from the outdoor environment.

SUMMARY OF THE INVENTION

A wildlife feeder for resting on the ground placement has a hopper with downwardly sloping bottom walls, generally vertical hopper side walls, and a top wall. The wildlife feeder has legs for engaging the hopper side walls to support the hopper above the ground. A manifold having a longitudinal axis is mounted to the bottom of the hopper and depending generally vertically downward from the sloping bottom walls of the hopper. The manifold has a mouth at an upper end thereof and a feed supply opening at the bottom end thereof and a cross-section. A head for engaging the manifold is provided with a plurality of feed troughs. The head receives palletized, grandular or particulate feed from the feed supply opening of the manifold at a bottom end of the manifold. The head comprises a horizontal floor, generally laying in a horizontal plane, the floor being perpendicular to the longitudinal axis of the manifold. Each feed trough has a bottom wall, a pair of side walls and a top wall. The floor has a perimeter, the perimeter joining the bottom walls of the feed trough. The bottom walls of the feed troughs transcribe an angle with respect to the floor of the head that may, in one embodiment, be between about 5-30°. The top walls of the feed troughs transcribing an angle that may, in one embodiment, be of between about 110-155° with respect to the longitudinal axis of the manifold. The bottom wall may include a recessed upturned lip, the lip having a top edge, the top edge with a height that is preferably below the plane of the tabular floor of the head.

BRIEF DESCRIPTION OF THE DRAWINGS

FIGS. 1 and 1A illustrate perspective views of a first and second preferred embodiment of Applicant's wildlife feeder, the difference being that FIG. 1 illustrates a rectangular hopper having rectangular bottom walls and a rectangular manifold leading to a novel head 28.

DETAILED DESCRIPTION OF THE PREFERRED EMBODIMENT

Figure 1:
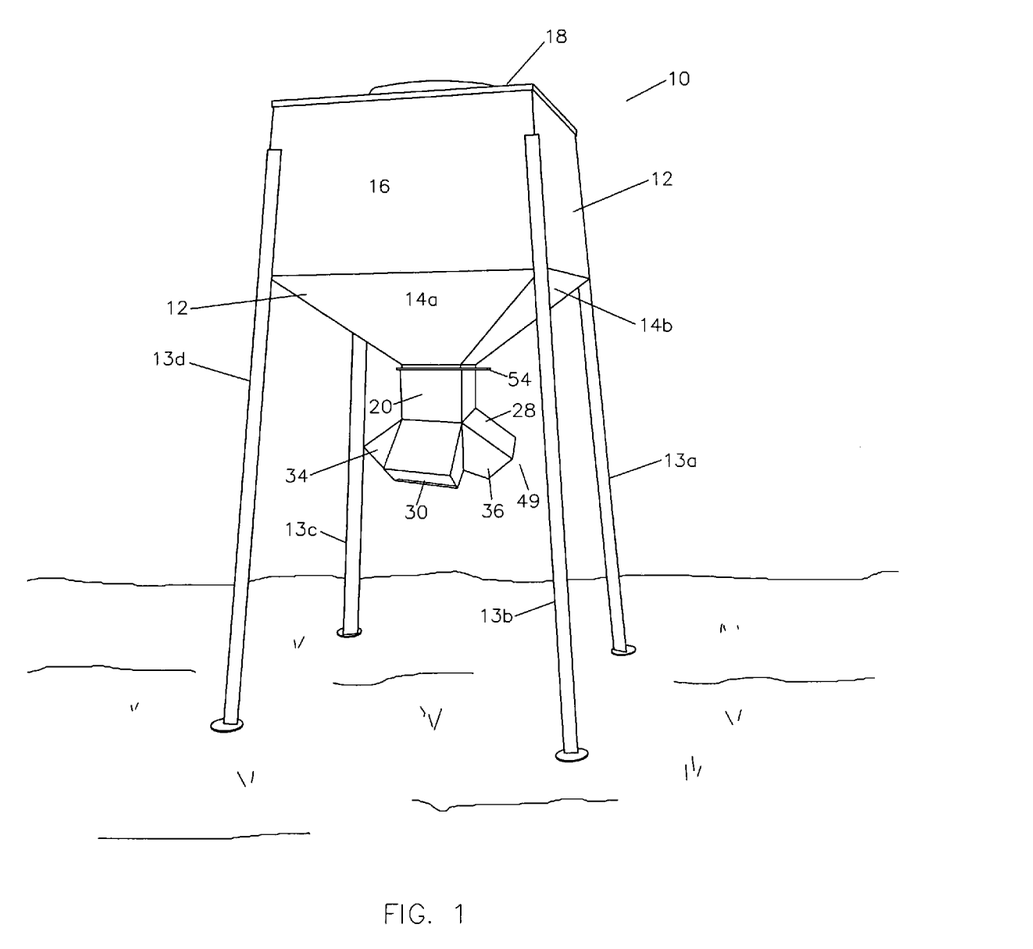
Figure 1A:
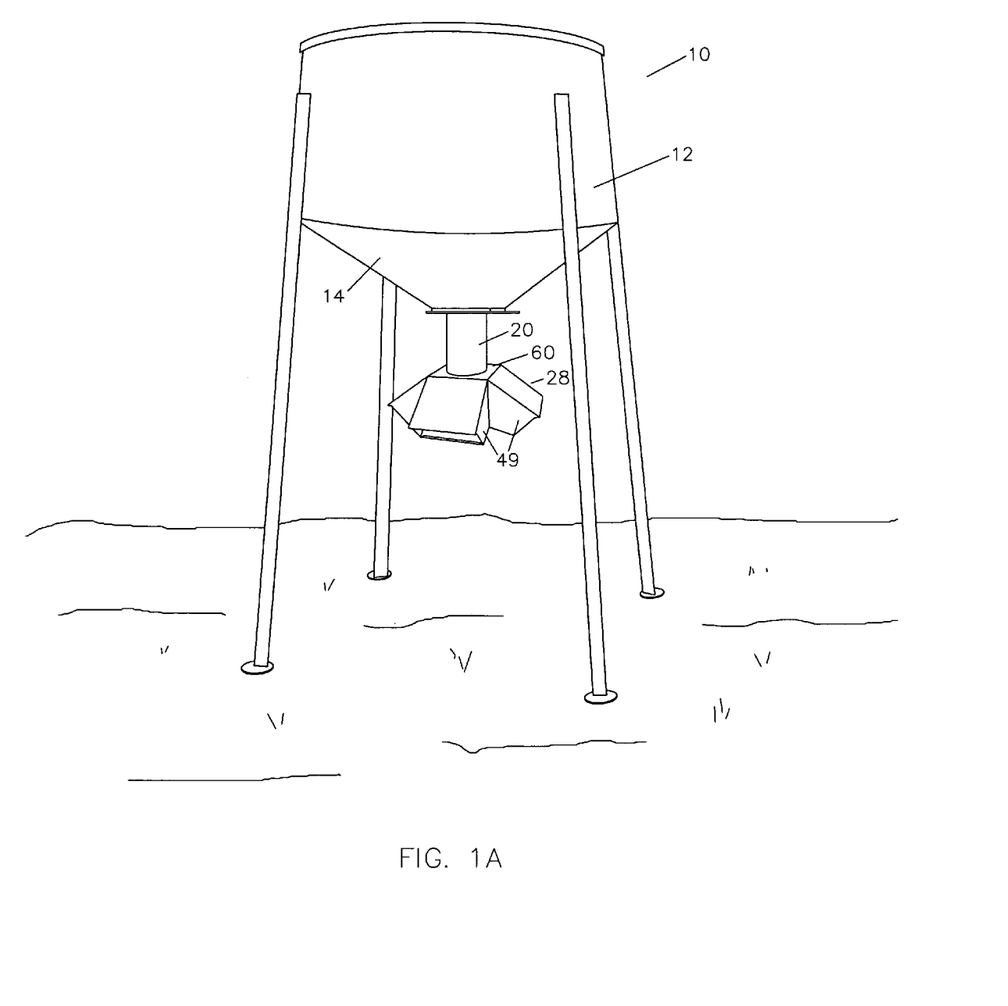
FIG. 1A illustrates a conical hopper with conical bottom walls and a conical manifold leading to a novel head 28.

FIG. 1 illustrates a wildlife feeder 10. Wildlife feeders are known in the art to dispense palletized, grandular, and particulate wildlife feed, such as corn, protein pellets, peas, soybeans and nutritional supplements to wildlife, such as deer and elk. Wildlife feeders 10 are typically constructed having a storage hopper section 12 for retaining and maintaining the feed therein. The hopper 12 is spaced apart vertically above the ground on legs 13a, 13b, 13c, and 13d. The hopper may be generally rectangular in shape as illustrated in FIG. 1, and may include a multiplicity of generally vertical side walls 16. In alternate embodiments, the hopper may be cylindrical as illustrated in FIG. 1A. The hopper may include a bottom wall 14, typically sloping downwardly from the generally vertical hopper side wall. Bottom walls may be conical (FIG. 1A) or comprised of a number of sections 14a and 14b, as illustrated in FIG. 1 (the two other remaining sections of bottom wall 14 being hidden in the view illustrated in FIG. 1). Hoppers typically include a top wall 18, which may be removable, or fixed to the hopper side walls, in which case there would be an access opening somewhere in the hopper, for example, a small separate lid (not shown) comprising a portion of the top wall.

The sloped bottom walls 14 are seen to engage a generally vertically manifold 20 for delivery of feed from the sloping bottom wall at the base of the hopper to a head 28. The head is seen to comprise of a multiplicity of feed troughs, typically one to four, here illustrated as feed troughs 30, 32, 34, and 36. Optionally, a sliding gate assembly 54 as known in the art may be provided between the sloping bottom wall 14 of hopper 12 and head 28. Gate assemblies 54 provide a means for controlling the flow of feed from the hopper to the manifold and therefore the head.

Turning now to FIGS. 1, 2, 3, 4, and 5, it is seen that manifold 20 may be cylindrical (see FIG. 1A) or rectangular (see FIG. 1) and is hollow. Manifold 20 includes a mouth 22 at the uppermost portion thereof for receiving feed from the upper hopper 12. Generally vertical walls define a throat 24 for carrying feed through the manifold to a multiplicity of feed openings 26. The feed openings and the bottom end of the manifold allow particulate feed to enter the housing. Manifold 20 has a longitudinal axis "A."

Figure 2:
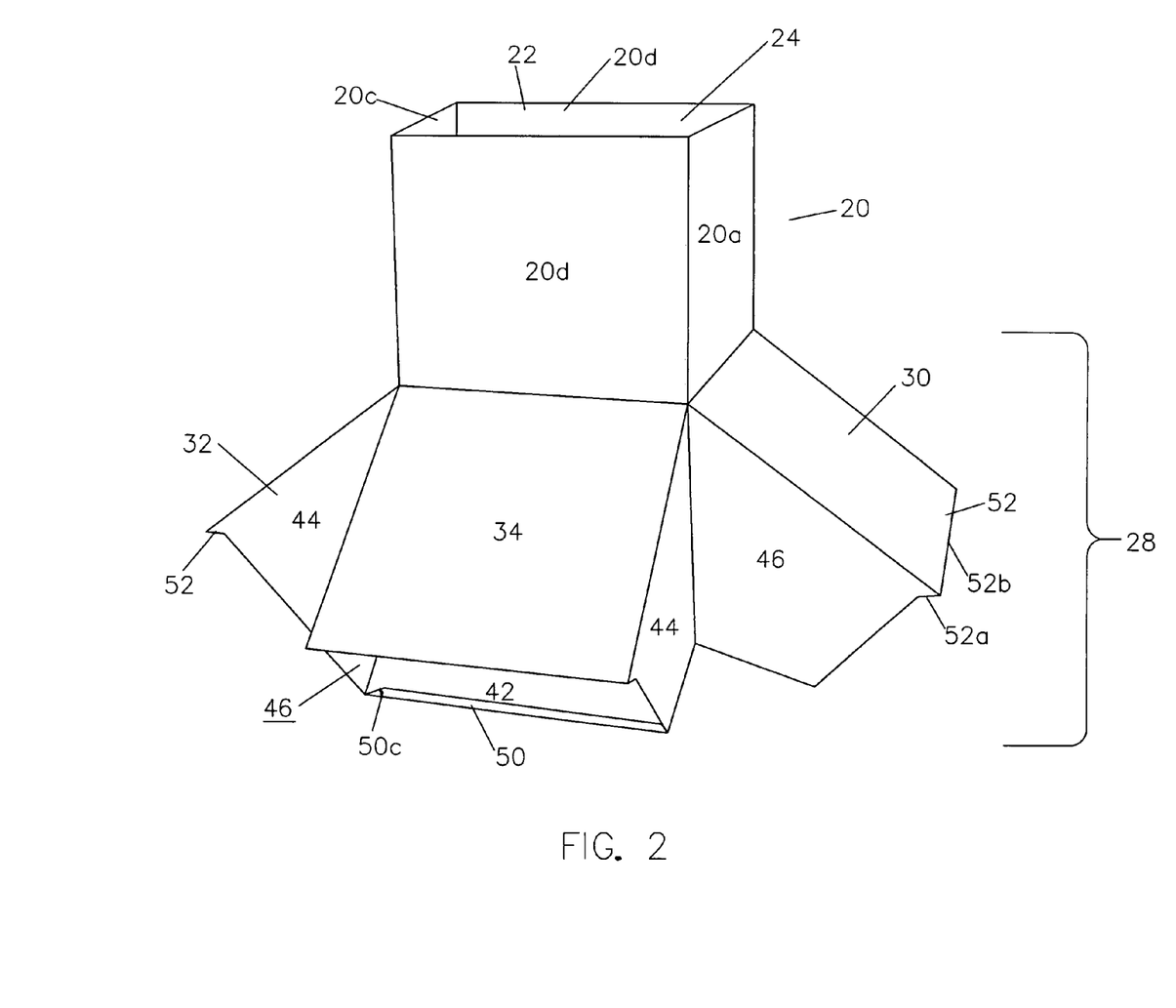
FIG. 2 is a perspective external view of the manifold and head of Applicant's novel wildlife feeder.
Figure 3:
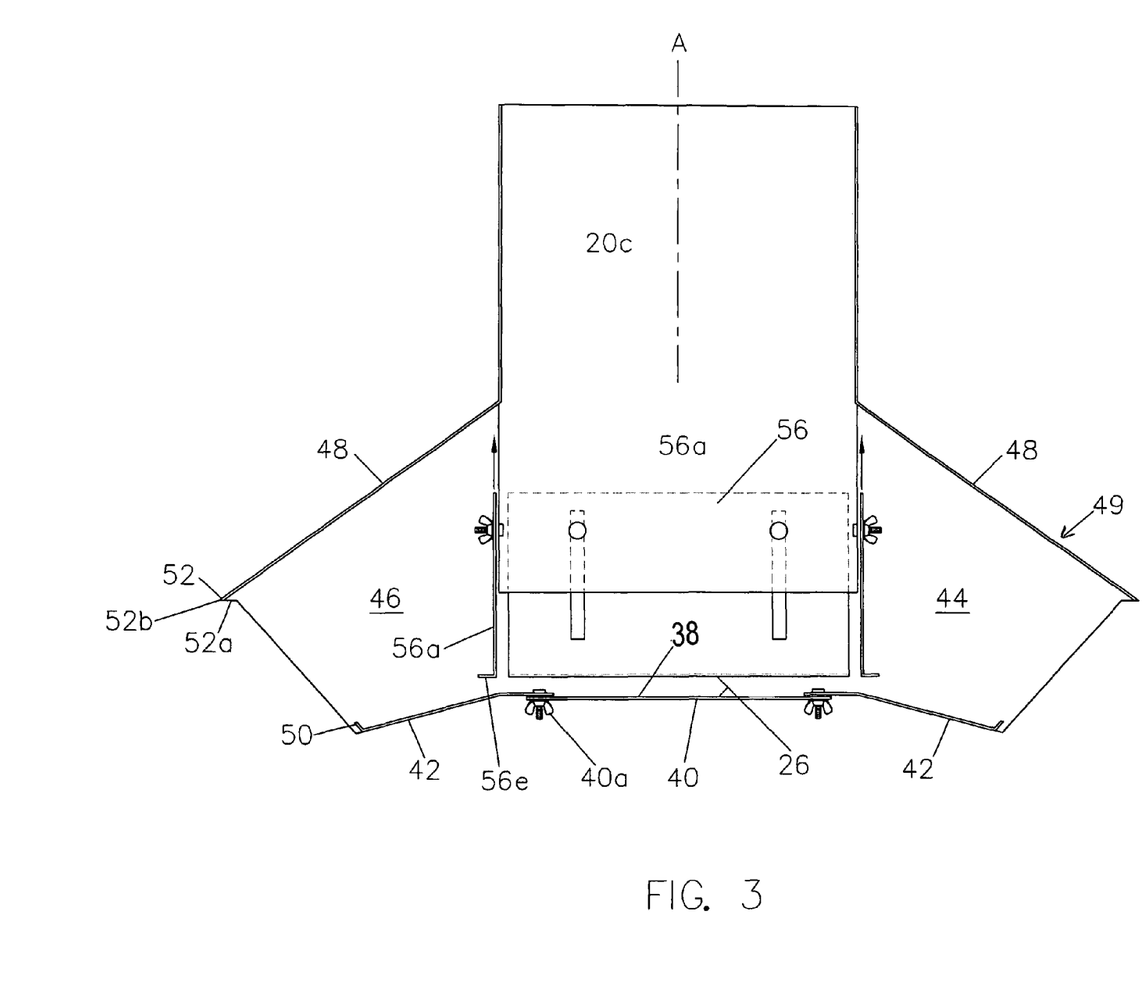
FIG. 3 illustrates a cross-sectional view of Applicant's manifold and head for a wildlife feeder.
Figure 4:
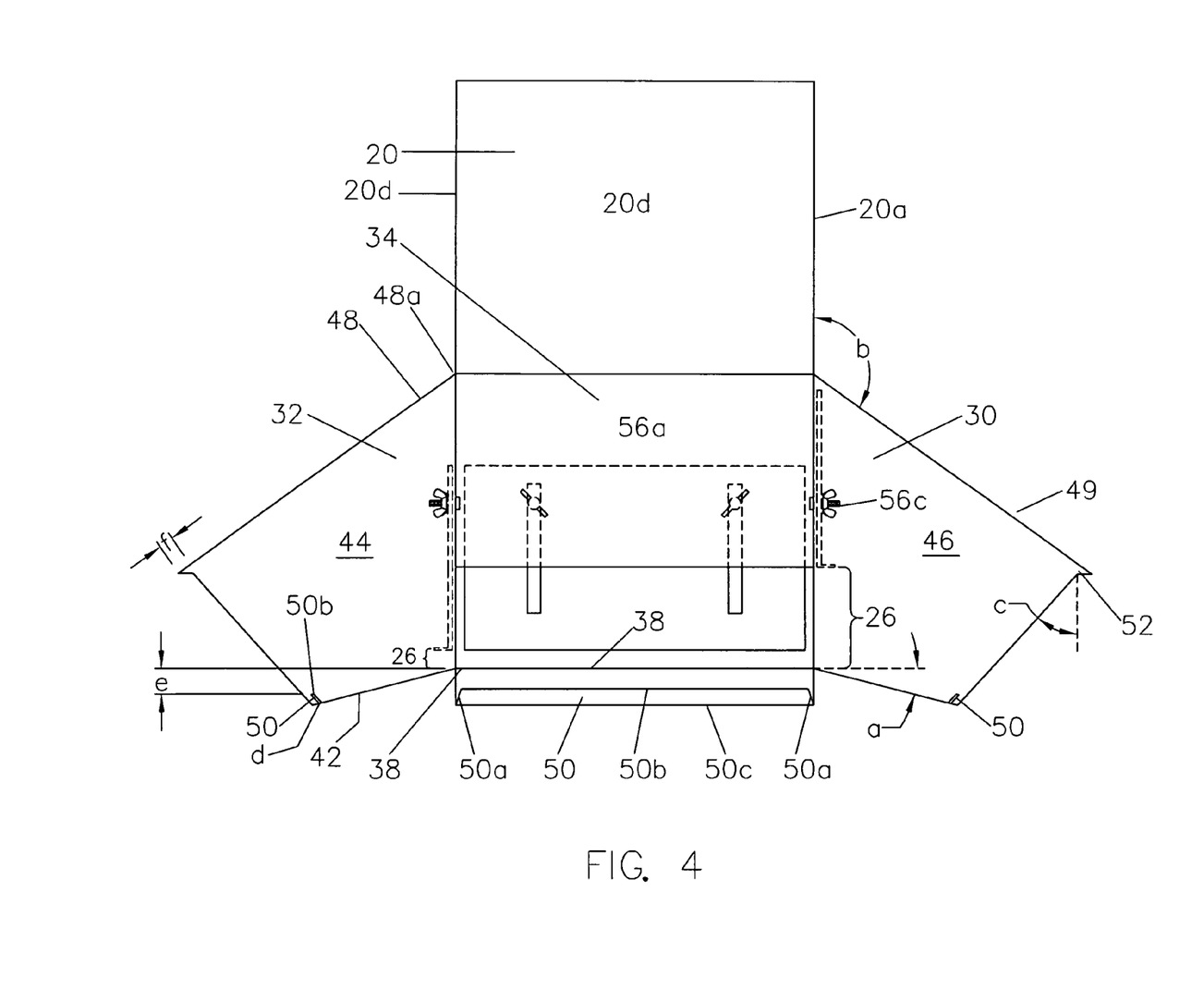
FIG. 4 illustrates a side elevational view of Applicant's manifold and head for a wildlife feeder.
Figure 5:
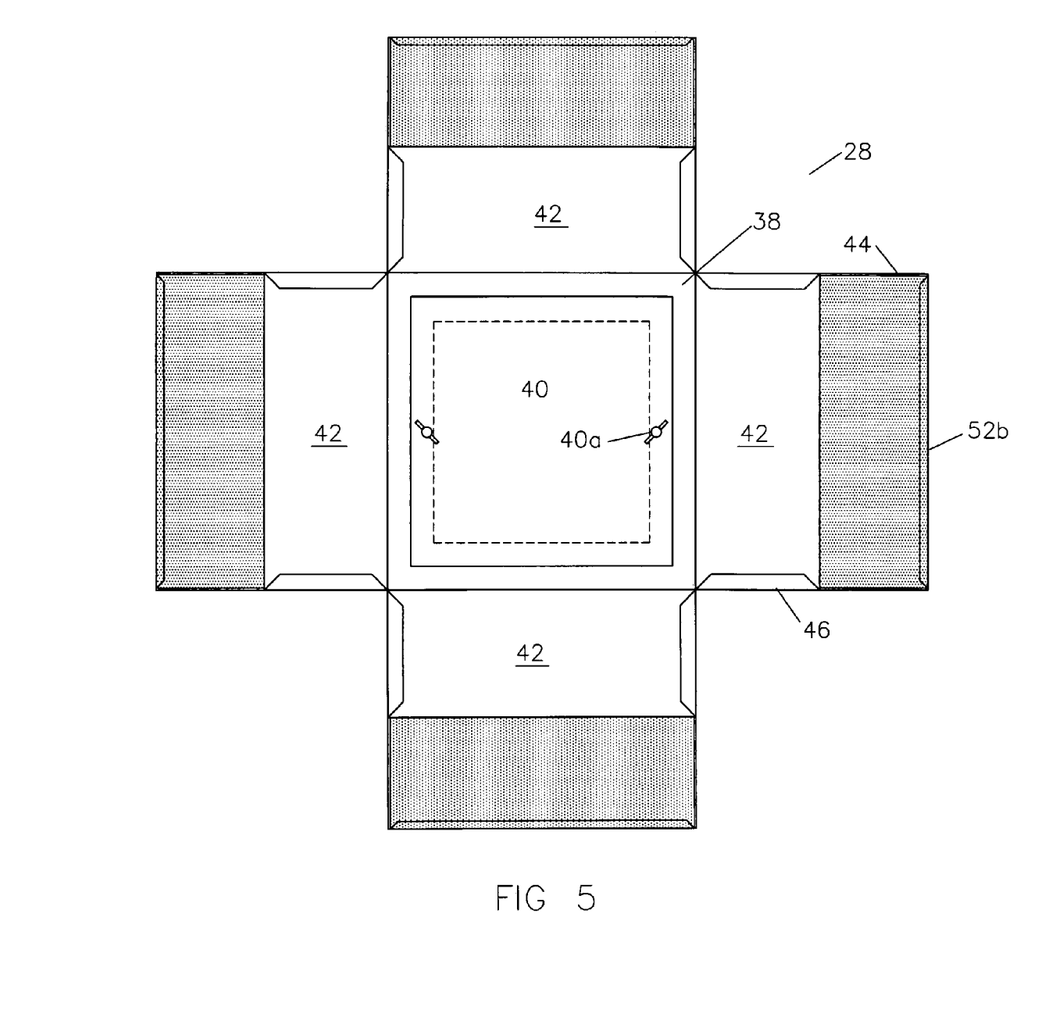
FIG. 5 illustrates a bottom elevational view of the head of Applicant's wildlife feeder.

As seen in FIGS. 2, 3, and 4, head 28 further has a multiplicity of feed troughs 30, 32, 34, 36 extending laterally outward from axis "A". Head 28 is also comprised of a floor 38, which floor is perpendicular to manifold axis A and generally tabular. Floor 38 may include a removable cleanout plate 40, which would typically be held in place by hand engageable fasteners 40a, such as wing nuts.

Turning now to the troughs, it is seen that the troughs are constructed substantially identical one to the other. Feed troughs are seen to include a tabular bottom wall 42, upstanding side walls 44, 46, and a top wall 48. The four walls collectively may define a feed trough housing 49. The side walls of adjacent feed troughs typically connect to one another (see FIG. 5). The top walls engage the manifold and the bottom walls engage floor 38.

Feed troughs 30, 32, 34, and 36 may include a lower lip 50 which stands above bottom wall 42. As may be seen in FIG. 4, lower lip 50 may include a pair of lower lip side walls 50a, a lower lip top edge 50b, and a lower lip bottom edge 50c.

An upper lip 52 may extend beyond side walls 44 and 46 and may be engaged therewith to oblique upper lip side walls 52a. Upper lip 52 may have an upper lip front edge 52b.

An adjustable baffle assembly 56 may be provided to control the size (vertically) of the four feed openings 26 in the manner illustrated in FIGS. 3 and 4. For example, FIG. 4 illustrates the adjustable baffle in feed trough 32 (see in side view) is almost closed and that in feed trough 30 is fully opened. Adjustable baffle assembly 56 may be comprised of a fixed plate 56a with a movable baffle plate 56b engaged therewith. Baffle plate 56b is seen to have a pair of slots 56d through which fasteners 56c (engaged to fixed plate 56a) extend therethrough. Fasteners 56c, such as wing nuts, may be tightened to hold baffle plate 56b to fixed plate 56a once the desired opening is selected, or loosened so that lower edge 56e, defining the upper opening of feed openings 26, may be moved up or down.

Adjustable baffle assembly 56 may be omitted, in which case the bottom edge of fixed plate 56a defines a fixed baffle, which has a fixed feed opening 26, the feed opening being the space between the lower edge of 56a as seen in FIG. 4 and the floor 38 (trough 30). Typically, fixed plate 56a is integral with and forms a lower wall portion of manifold side walls—that is, manifold side walls typically extend below the point where the trough top walls 40 are attached thereto.

Turning back to FIGS. 2, 3, and 4, details of some of the structure of housing 49 may be appreciated. The lower lip 50 is designed to both prevent access of rain into the housing, but also to stack up particulate feed matter there behind. Moreover, it is seen with respect to FIG. 4 that a distance e may be provided, which distance e is the distance between the plane of floor 38 of head 28 and top edge 50b of lower lip 50, typically about ⅛ inch to about ¾ inch. It is typically provided that top edge 50b of lower lip 50 is below the plane of bottom wall 30a, typically at least about ⅜ inch. This will prevent the water or moisture that may accumulate behind lower lip 50 from creeping up, as by capillary action in the feed or the like, onto floor 38 and into any feed that may be resting on the floor or in the manifold.

It is further seen that lower lip 50 may be spaced back from a front edge of bottom wall 42 and the side wall front edges of the housing 49. This distance d may be between about ¼ inch and about ½ inch. Spacing the lower lip back from the side wall front edges helps keep moisture out of the housing. The removed ends of lower lip 50 may include side walls 50a that are spaced apart from adjacent feed trough side walls 44, 46 to leave a gap, a small gap, for moisture or the like that may collect behind the lip to seep out.

Likewise, upper lip 52 may extend beyond the side walls a distance of 1/16 inch to greater than one inch as designated "f" in FIG. 4. Upper lip 52 is adapted to help keep moisture out of the housing.

Angular relationships may be appreciated with reference to FIGS. 2, 3, and 4. Angle "a" is designated as the angle between the plane of bottom wall 30a and the bottom walls 42 of the feed trough and is typically designed to provide a sufficient angle to deliver particulate feed, under the impetus of gravity, to lower lip 50, but not be too steep for the particulate feed to overflow excessively. An angular range of 5 to 45° may be provided with a preferred range of 5 to 20°, of the more preferred range of 12-17°, preferred 15°.

Angle "b" defines an angle between axis "A" or vertical side wall of the manifold and top wall 48 of housing 49. Angle "b" should be steep enough to prevent animals, such as raccoons, from perching thereupon (and robbing feed) and be steep enough to shed water easily. Angles "b" have been found to be suitable in the preferred range of, but not limited to, 130 to 140°.

Angle "c" is the angle of cutback between the vertical axis A and the front edges of side walls 44 and 46. Such an angular cutback is preferably in the range of, but not limited to, 30 to 60°, and most preferably about 45°. This angle is preferably sufficiently large to provide, in conjunction with lip 52, sufficient overhang to keep particulate feed in housing 49 dry. On the other hand, the angle should not be so excessive that it would prevent access for the muzzle of an animal, such as a deer, to enter the mouth of housing 49, so as to obtain particulate feed therein.

Figure 6:
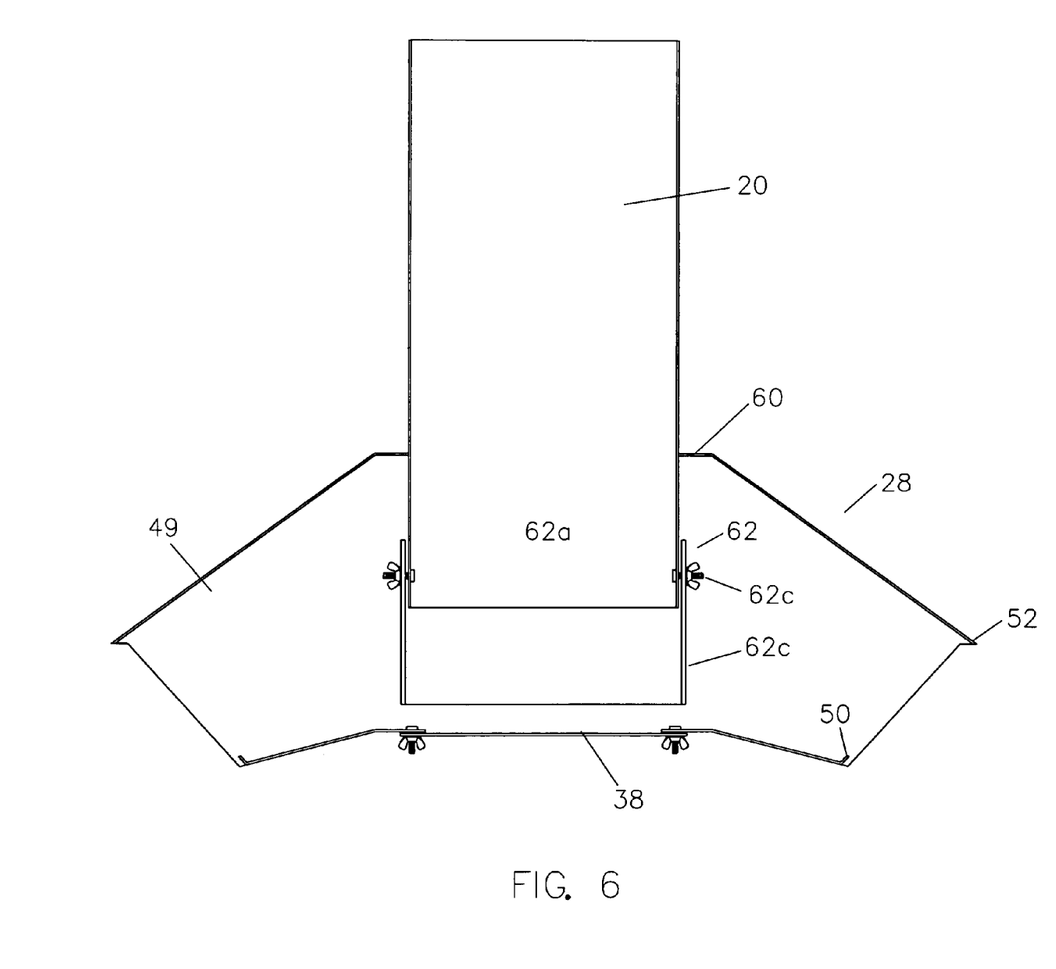
FIG. 6 illustrates a cross-sectional view of Applicant's wildlife feeder having a round manifold engaging head 28 through the use of adapter plate 60.
Figure 7:
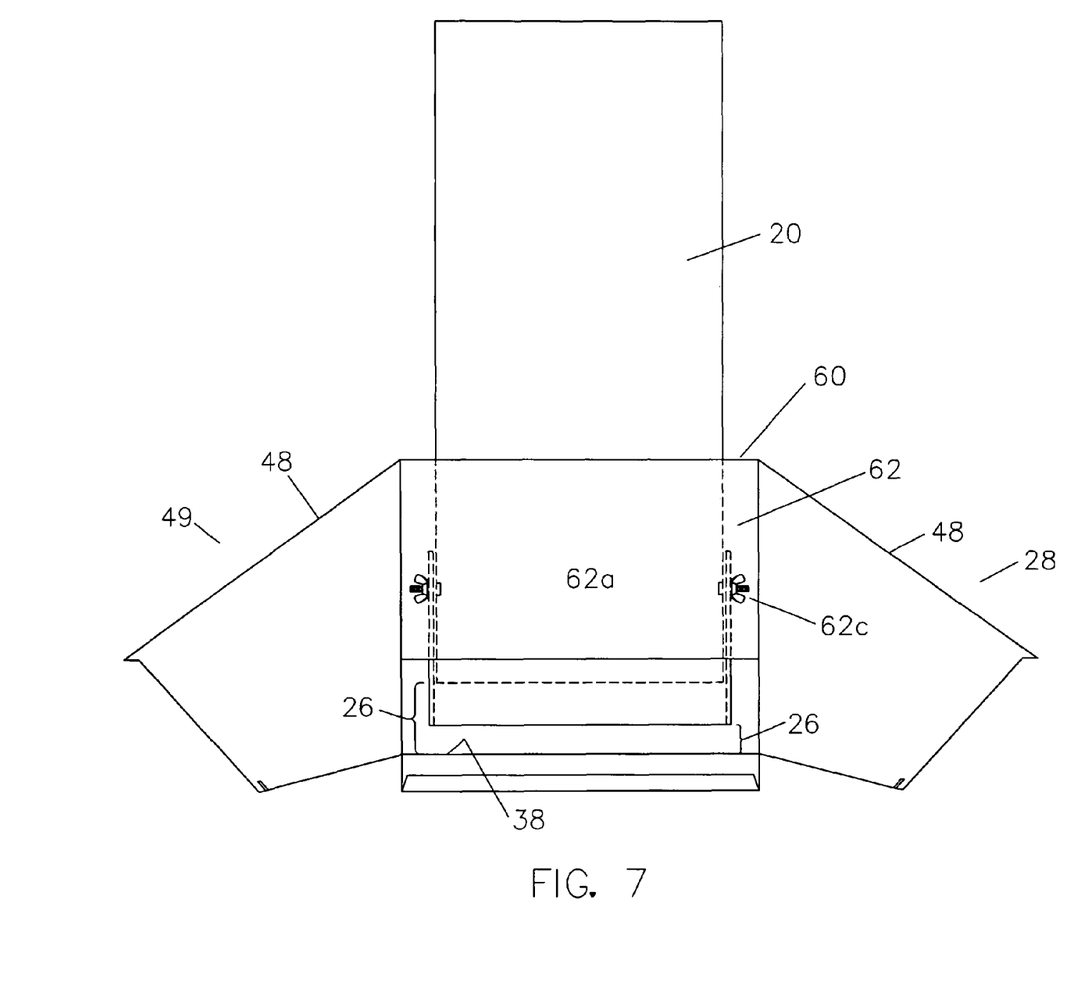
FIG. 7 is a side elevational view of the alternate preferred embodiment of the manifold and head assembly as set forth in FIG. 6.
Figure 8:
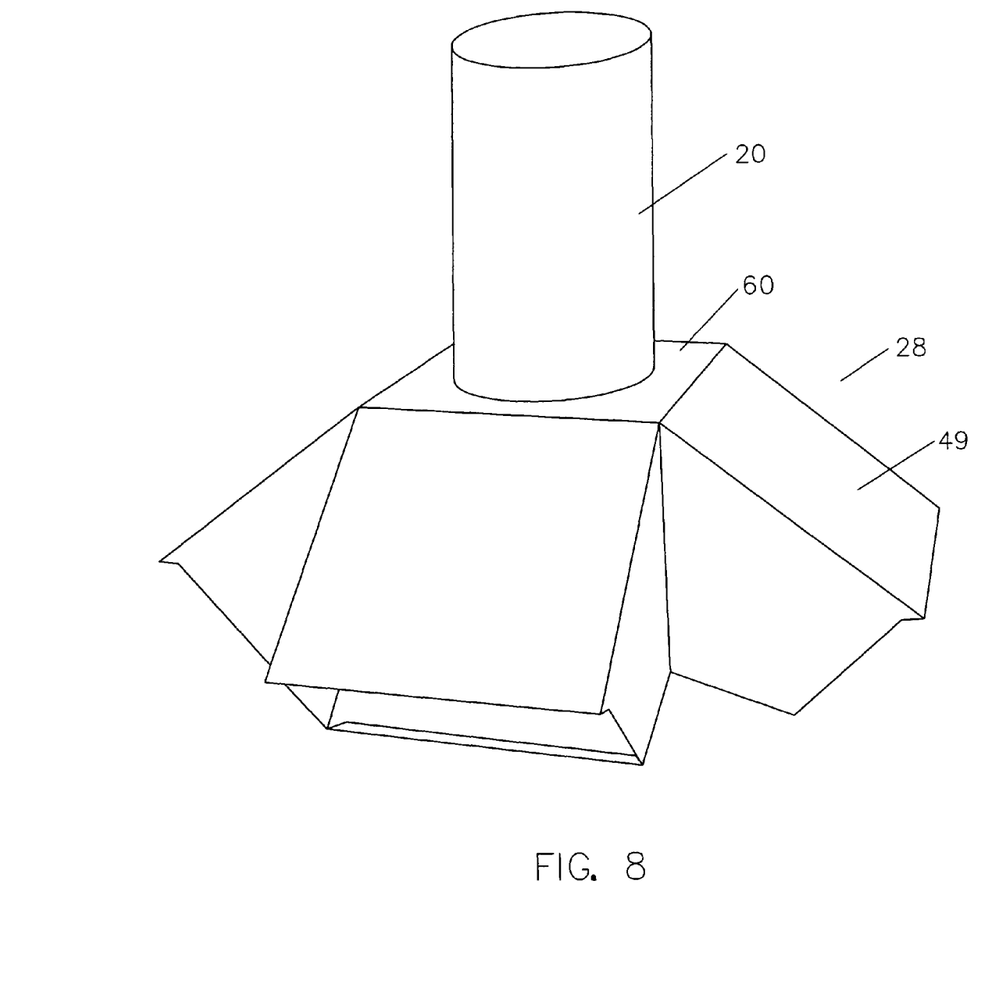
FIG. 8 is an external perspective view of the manifold and head of the embodiment set forth in FIGS. 6 and 7 above.

FIGS. 6-8 illustrate an alternate preferred embodiment of Applicant's device having a round (cylindrical) shaped manifold, connected through the use of an adapter plate 60, which may form a part of head 28. That is to say, an adapter plate is provided to adapt the top wall of the housing to a cylindrical rather than a rectangular shape.

Further, it may be seen that a cylindrical manifold may extend below the adapter plate so as to provide a single cylindrical fixed plate 62a as part of an adjustable baffle assembly 62 that will serve the same function as adjustable baffle assembly 56 in the embodiments illustrated in FIGS. 2, 3, and 4.

Cylindrical fixed plate 62a therefore extends well below adapter plate 60 and well below top wall 48 of housings 49. Fasteners 62c are provided in slots (not shown) typically two, of baffle plate 62b, the two slots are typically 180° apart. Fasteners 62c are mounted to cylindrical fixed plate 62a and extend through the slots so a wing nut or the like of fasteners 62c may be tightened down when the desired height of manifold feed opening 26 is reached. Two such heights are illustrated in FIG. 7 as manifold feed openings 26. Moreover, if an adjustable baffle assembly 62 is not used, the bottom edge of cylindrical fixed plate 62a may act as a fixed baffle and deliver feed to the floor 38. Pressure of the particulate feed will work the feed into the housings 49. As an animal eats the particulate feed out of the lower end of the housing, more will flow from the hopper through the manifold to the floor and through manifold feed opening 26 (whether fixed or adjustable).

Although the foregoing specific details describe a preferred embodiment of this invention, persons reasonably skilled in the art will recognize that various changes may be made in the details of this invention without departing from the spirit and scope of the invention as defined in the appended claims. Therefore, it should be understood that this invention is not to be limited to the specific details shown and described herein.

The invention claimed is:

1. A wildlife feeder for placement on the ground, the wildlife feeder comprising:
    a hopper having a downwardly sloping bottom wall, a generally vertical hopper side wall and a top wall;
    a plurality of legs engaging the hopper to support the hopper above the ground;
    a generally vertical manifold having a longitudinal axis, the manifold mounted to the bottom of the hopper and descending generally vertically from the downwardly sloping bottom wall of the hopper, the manifold having a mouth at an upper end thereof and a feed supply opening at the bottom end thereof, the manifold having a cross-section;
    a head engaging the manifold, the head having a multiplicity of feed troughs, wherein each feed trough has a tabular bottom wall, a pair of tabular side walls and a tabular top wall, the head receiving feed from the feed supply opening of the manifold, wherein the head comprises a horizontal floor, generally laying in a horizontal plane, the floor being perpendicular to the longitudinal axis of the manifold, wherein the floor has a perimeter, the perimeter joining the bottom walls of the feed trough;
    wherein the bottom wall of each feed trough transcribes an angle with respect to the floor of the head of between about 5° to about 30° and wherein each of the feed trough top walls transcribe an angle of between about 110° to about 155° with respect to the longitudinal axis of the manifold;
    wherein each of the feed trough bottom walls includes an upturned lip, each upturned lip having a top edge, each top edge having a height that is below the plane of the tabular floor of the head.

2. The wildlife feeder of claim 1, wherein the floor of the head includes a cleanout plate removably engaged therewith.

3. The wildlife feeder of claim 1, wherein each feed trough top wall has a removed or overhanging lip thereupon.

4. The wildlife feeder of claim 1, wherein the upturned lip is recessed from a removed end of the bottom wall and has a gap between the upturned lip and the adjacent side walls.

5. The wildlife feeder of claim 1, wherein the manifold further includes at least one adjustable baffle assembly for adjustably controlling the size of the feed supply opening control the flow of the feed.

6. The wildlife feeder of claim 1, wherein the feed trough side walls are cut with respect to the longitudinal axis of the manifold at an angle in the range of about 30 to 60 degrees.

7. The wildlife feeder of claim 1, wherein the floor of the head is tabular and has a cleanout plate engaged therewith.

8. The wildlife feeder of claim 1, further comprising a gate for controlling the amount of feed transversing the manifold.

9. The wildlife feeder of claim 1, wherein the cross-section of the manifold is circular.

10. The wildlife feeder of claim 1, wherein the cross-section of the manifold is rectangular.

11. The wildlife feeder of claim 3, wherein each feed trough side wall has a front edge that forms an oblique angle with a front edge of the overhanging lip.

12. The wildlife feeder of claim 1, wherein the upturned lip is recessed from a removed end of the bottom wall from a removed end of the bottom wall.

13. A wildlife feeder for placement on the ground, the wildlife feeder comprising:
    a hopper having a sloped bottom wall, a hopper side wall and a top wall;
    a plurality of legs for engaging the hopper to support the hopper above the ground;
    a manifold having a longitudinal axis, the manifold mounted to the bottom of the hopper and descending generally vertically from the bottom wall of the hopper, the manifold having a mouth at an upper end thereof and a feed supply opening at the bottom end thereof, the manifold having a cross-section;
    a head for engaging the manifold, the head having a multiplicity of feed troughs, wherein each feed trough has a tabular bottom wall, a pair of tabular side walls and a tabular top wall, the head for engaging and receiving particulate feed from the feed supply opening of the manifold, wherein the head comprises a horizontal floor, generally laying in a horizontal plane, the floor being perpendicular to the longitudinal axis of the manifold, wherein the floor has a perimeter, the perimeter joining the bottom walls of the feed trough;
    wherein the bottom wall of each of the feed troughs transcribes an angle with respect to the floor of the head of between about 5° to about 20° and wherein the top walls of the feed troughs transcribing an angle of between about 110° to about 155° with respect to the longitudinal axis of the manifold;
    wherein each bottom wall includes an upturned lip, the lip having a top edge, the top edge with a height that is below the plane of the tabular floor of the head;
    wherein the head further includes at least one adjustable baffle assembly for adjusting the size of the feed supply opening to help control the flow of the particulate feed;
    wherein the side walls of the feed troughs are cut back with respect to the longitudinal axis of the manifold, at an angle in the range of about 30 to 60 degrees; and
    wherein the floor of the head is tabular and has a cleanout plate engaged therewith.

14. The wildlife feeder of claim 13, wherein the top wall has a removed or overhanging lip thereupon.

15. The wildlife feeder of claim 13, wherein the upturned lip is recessed about ¼ to about ¾ inch and has a gap between the upturned lip and the adjacent side walls.

16. The wildlife feeder of claim 13, further including a gate for controlling the amount of particulate feed transversing the manifold.

17. The wildlife feeder of claim 13, wherein the cross-section of the manifold is circular.

18. The wildlife feeder of claim 13, wherein the cross-section of the manifold is straight sided.

19. The wildlife feeder of claim 13, wherein the side walls of the feed troughs have a front edge that forms an oblique angle with a front edge of the overhanging lip.

20. A wildlife feeder for placement on the ground, the wildlife feeder comprising:
    a hopper having a sloped bottom wall, a hopper side wall and a top wall;
    a plurality of legs for engaging the hopper to support the hopper above the ground;
    a manifold having a longitudinal axis, the manifold mounted to the bottom of the hopper and descending generally vertically from the bottom wall of the hopper, the manifold having a mouth at an upper end thereof and a feed supply opening at the bottom end thereof, the manifold having a cross-section;

a head for engaging the manifold, the head having a multiplicity of feed troughs, wherein each feed trough has a tabular bottom wall, a pair of tabular side walls and a tabular top wall, the head for engaging and receiving particulate feed from the feed supply opening of the manifold, wherein the head comprises a horizontal floor, generally laying in a horizontal plane, the floor being perpendicular to the longitudinal axis of the manifold, wherein the floor has a perimeter, the perimeter joining the bottom walls of the feed trough;

a gate for controlling the amount of particulate feed transversing the manifold;

wherein each of the bottom walls of the freed troughs transcribe an angle with respect to the floor of the head of between about 5° to about 20° and wherein the top walls of the feed troughs transcribing an angle of between about 110° to about 155° with respect to the longitudinal axis of the manifold;

wherein the bottom wall of each trough includes an upturned lip, the lip having a top edge, the top edge with a height that is below the plane of the tabular floor of the head;

wherein the head further includes at least one adjustable baffle assembly for adjustably controlling the size of the feed supply opening to help control the flow of the particulate feed;

the side walls of each of the feed troughs are cut back with respect to the longitudinal axis of the manifold, at an angle in the range of about 30 to 60 degrees;

wherein the floor of the head is tabular and has a cleanout plate engaged therewith;

wherein the top wall has a overhanging lip thereupon;

wherein the upturned lip is recessed and has a gap between the upturned lip and the adjacent side walls;

wherein the cross-section of the manifold is circular or is straight sided.

* * * * *